US012808479B2

(12) United States Patent
Lin et al.

(10) Patent No.: US 12,808,479 B2
(45) Date of Patent: Nov. 24, 2026

(54) CONNECTING MEMBER, AND MOUNTING AND DISMOUNTING ASSEMBLY

(71) Applicant: SHENZHEN LEQI INNOVATION CO., LTD., Shenzhen (CN)

(72) Inventors: Qiang Lin, Shenzhen (CN); Zhiqiang Pan, Shenzhen (CN); Feng Zhou, Shenzhen (CN); Yang Zhou, Shenzhen (CN)

(73) Assignee: SHENZHEN LEQI INNOVATION CO., LTD., Shenzhen (CN)

( * ) Notice: Subject to any disclaimer, the term of this patent is extended or adjusted under 35 U.S.C. 154(b) by 241 days.

(21) Appl. No.: 18/628,828

(22) Filed: Apr. 8, 2024

(65) Prior Publication Data

US 2025/0207720 A1 Jun. 26, 2025

(30) Foreign Application Priority Data

Dec. 22, 2023 (CN) ......................... 202311806511.8

(51) Int. Cl.

*F16M 11/04* (2006.01)
*G03B 17/56* (2021.01)

(52) U.S. Cl.

CPC ...... *F16M 11/041* (2013.01); *F16B 2200/205* (2018.08); *F16B 2200/69* (2023.08);
(Continued)

(58) Field of Classification Search

CPC ..... B60R 2011/0059; B60R 2011/0071; B60R 2011/0078; G03B 17/561; G03B 17/563; G03B 17/566; F16B 2/06; F16B 2/14; F16B 2/18; F16B 7/042; F16B 7/0473; F16B 2200/20; F16B 2200/205; F16B 2200/69; F16M 11/041; F16M 11/043; F16M 11/045; F16M 11/046; F16M 11/048; F16M 11/16; F16M 2200/028; Y10S 403/04; Y10T 403/32229; Y10T 403/32426;
(Continued)

(56) References Cited

U.S. PATENT DOCUMENTS 6,234,690 B1 * 5/2001 Lemieux ............. F16M 11/041
396/419
7,849,867 B2 * 12/2010 Takayama .............. E04H 15/60
135/114
(Continued)

FOREIGN PATENT DOCUMENTS

CN 114198373 A * 3/2022 ............. F16M 11/04

*Primary Examiner* — Josh Skroupa

(57) ABSTRACT

A connecting member includes a connecting base defined with a nesting slot, and the connecting base is nested on a structural member through the nesting slot. The structural member is defined with an adapting slot, the connecting base is provided with a driving structure, a reset member, and a clamping member, the clamping member is exposed on a sidewall of the nesting slot and matched to the adapting slot, and the driving structure is movably disposed on the connecting base. The driving structure includes a pressing member and a driving button, the clamping member is disposed on a sliding path of the pressing member, the pressing member is configured to press or loosen the clamping member, the driving button presses and drives the pressing member to slide, and the reset member is configured to apply a force to the driving button to reset the driving button.

8 Claims, 5 Drawing Sheets

(52) U.S. Cl.
CPC .......... *G03B 17/561* (2013.01); *G03B 17/566* (2013.01); *Y10S 403/04* (2013.01); *Y10T 403/591* (2015.01); *Y10T 403/599* (2015.01); *Y10T 403/602* (2015.01)

(58) Field of Classification Search
CPC ..... Y10T 403/32442; Y10T 403/32451; Y10T 403/58; Y10T 403/581; Y10T 403/59; Y10T 403/591; Y10T 403/598; Y10T 403/599; Y10T 403/60; Y10T 403/602; Y10T 403/7066; Y10T 403/7092
USPC ......... 403/80, 104, 106, 107, 315, 316, 321, 403/322.1, 324, 325, 326, 327, 374.2, 403/380, DIG. 4
See application file for complete search history.

(56) References Cited

U.S. PATENT DOCUMENTS

| | | | | |
|---|---|---|---|---|
| 8,671,799 | B2 * | 3/2014 | Chen | G05G 5/065 403/321 |
| 12,547,059 | B2 * | 2/2026 | Zhou | G03B 17/566 |
| 2024/0411213 | A1 * | 12/2024 | Jiang | G03B 17/566 |
| 2024/0426417 | A1 * | 12/2024 | Lin | F16M 11/045 |
| 2025/0180972 | A1 * | 6/2025 | Wu | G03B 17/566 |

* cited by examiner

CONNECTING MEMBER, AND MOUNTING AND DISMOUNTING ASSEMBLY

TECHNICAL FIELD

The present disclosure relates to the technical field of photographic equipment, in particular to a connecting member and mounting and dismounting assembly.

BACKGROUND

In the field of photographic equipment, a connecting member is commonly used to connect two devices, for example, a functional device is arranged on a camera support through the connecting member. However, the connecting member in related art has a complex structure and is prone to slipping, resulting in that the connection between the devices is not tight enough, which affects user experience.

SUMMARY

The present disclosure is to provide a connecting member and a mounting and dismounting assembly, to solve the technical problem of insufficient tight connection between parts of the photographic equipment.

To realize the above objective, the present disclosure provides a connecting member, and the connecting member includes:

a connecting base defined with a nesting slot. The connecting base is fitted to a structural member through the nesting slot; the structural member is defined with an adapting slot, the connecting base is provided with a driving structure, a reset member, and a clamping member, the clamping member is exposed on a sidewall of the nesting slot and matched to the adapting slot, and the driving structure is movably disposed on the connecting base. The driving structure includes a pressing member and a driving button, the clamping member is disposed on a sliding path of the pressing member, the pressing member is configured to press or loosen the clamping member, the driving button presses and drives the pressing member to slide, and the reset member is configured to apply a force to the driving button to reset the driving button.

The connecting member has a locked state and an unlocked state; in the unlocked state, the pressing member loosens the clamping member when the driving button loosens the pressing member, to loosen the clamping member from the adapting slot; and in the locked state, the pressing member presses the clamping member when the driving button resets the pressing member, to clamp the clamping member in the adapting slot.

In some embodiments, the connecting base is defined with a mounting cavity. The pressing member is slidably arranged in the mounting cavity. The driving button is slidably penetrated into the mounting cavity and is at least partially exposed outside the connecting base, slide directions of the driving button and the pressing member are different. An end of the reset member resists the driving button, and the other end of the reset member resists a sidewall of the mounting cavity.

In some embodiments, an arcuate portion is protruded on the pressing member, a pressing surface of the driving button is defined with a groove matched to the arcuate portion. And the groove is configured to accommodate the arcuate portion during sliding of the driving button to loosen the pressing member.

In some embodiments, the arcuate portion is rotatably arranged on the pressing member by a shaft, the arcuate portion is cylindrical, and the arcuate portion rotates when the driving button slides along a surface of the arcuate portion.

In some embodiments, the connecting base includes a front base and a rear base fixedly connected to the front base. The mounting cavity is defined between the front base and the rear base. A sliding direction of the pressing member is same as an extension direction of the rear base, and the driving button is located on a side of the rear base.

In some embodiments, a pressing surface of the pressing member is defined with a pressing groove matched to the clamping member. In the locked state, an end of the clamping member is limited in the pressing groove.

In some embodiments, at least two clamping members are provided, at least two adapting slots are provided, and each clamping member is clamped in one of the adapting slots; and/or a bottom wall of the mounting cavity is defined with an accommodating slot to accommodate the clamping member. The connecting base is defined with a through-hole communicating the nesting slot and the accommodating slot. And the clamping member passes through the through-hole and exposed from a sidewall of the nesting slot.

In some embodiments, the driving button includes a pressing portion disposed on an outer side of the connecting base, the connecting member further includes an anti-false-touch member rotatably connected to the connecting base, and an free end of the anti-false-touch member is capable of rotating to between the pressing portion and the connecting base.

In some embodiments, an end face of the connecting base is provided with two oppositely arranged nesting portions, free ends of the two nesting portions are bent opposite each other and the nesting slot is formed among the two nesting portions and the connecting base; and/or a pressing direction of the driving button is different from an extension direction of the nesting slot.

The present disclosure further provides a mounting and dismounting assembly, the mounting and dismounting assembly includes a structural member and the connecting member, and the connecting base is provided with a connecting structure to connect with a first device.

The connecting member provided by the present disclosure can be connected to the structural member, in practical application, two devices (hereinafter first device and second device) of the photographic equipment may be connected by the connecting member of the structural member. The first device is connected to the connecting member, and the structural member may be the second device to be connected, or may be a intermediate connector connected with the second device. In the unlocked state, the pressing member loosens the clamping member when the driving button loosens the pressing member, to loosen the clamping member from the adapting slot, to allow the connecting member and the structural member being separable from each other. After being assembled, the connecting member is in the locked state, the pressing member presses the clamping member when the driving button resets the pressing member, to clamp the clamping member in the adapting slot, in such a way, tight connection between the connecting member and the structural member is realized, which in turn makes the connection between the two devices of the photographic equipment be tight, improving user experience.

Figure 1:
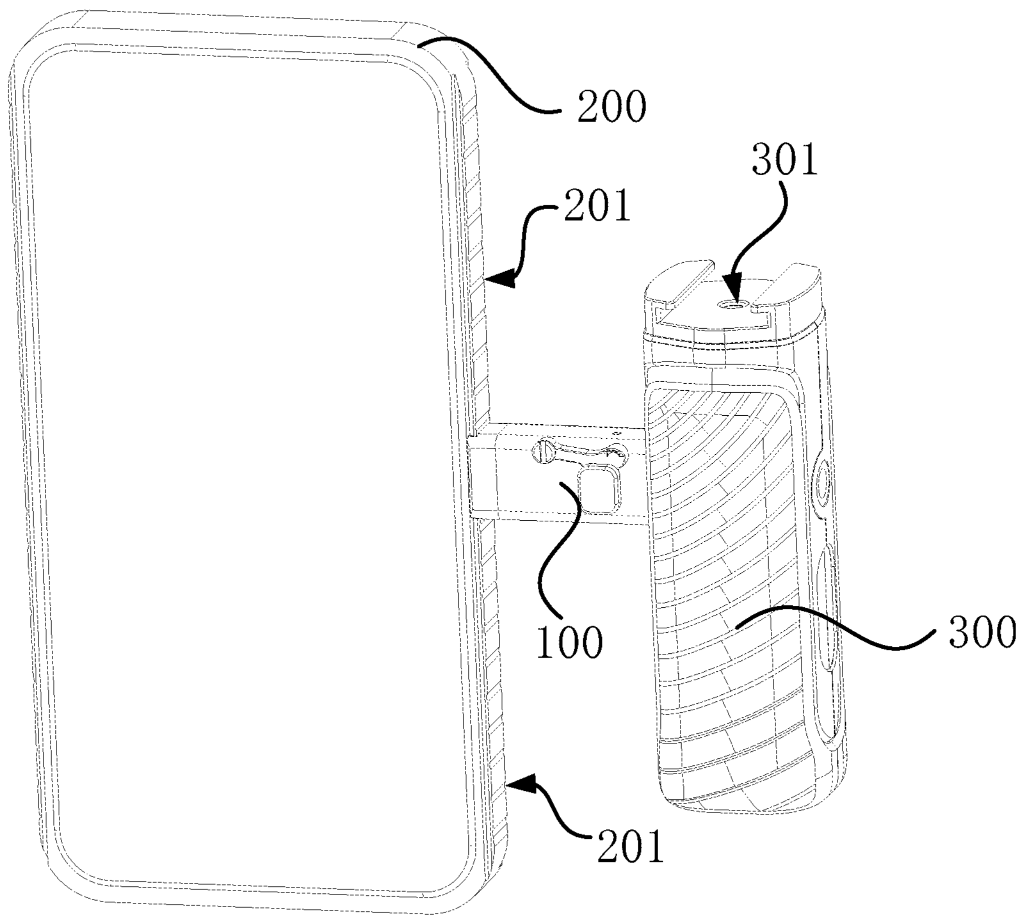
FIG. 1 is a schematic structural diagram of a connection between a connecting member and a structural member according to an embodiment of the present disclosure.

LABELS AND DESCRIPTIONS connecting base 110, nesting slot 111, sidewall of the nesting slot 1111, mounting cavity 110A, sidewall of the mounting cavity 1102, bottom wall of the mounting cavity 1105, accommodating slot 110B, opening 110C, nesting portion 1101, front base 1103, rear base 1104, driving structure 120, pressing member 121, arcuate portion 121A, surface of the arcuate portion 1211, pressing groove 1212, shaft 1213, driving button 122, pressing portion 1221, pressing surface of the driving button 1222, groove 122A, reset member 130, clamping member 140, anti-false-touch member 150;
structural member 200, adapting slot 201;
photographic handle 300, cold boot groove 301.

DETAILED DESCRIPTION OF THE EMBODIMENTS

The technical solutions in the embodiments of the present disclosure will be described clearly and completely with reference to the accompanying drawings. Obviously, the described embodiments are only a part of the embodiments of the present disclosure rather than all of them. Based on the embodiments in the present disclosure, all other embodiments obtained by those skilled in the art without creative work shall fall within the scope of protection of the present disclosure.

It should be noted that all directional indications (such as up, down, left, right, front, back) in the embodiments of the present disclosure are merely used to explain relative position relationships or motion conditions between the components in a particular attitude (as shown in the drawings). The directional indication changes as the particular attitude changes.

It should be noted that when an element is described as "being fixed on" or "being arranged on" another element, the element may be directly arranged on the another element or there may be an intermediate element. When an element is described as "being connected to" another element, the element may be directly connected to the another element or there may be an intermediate element.

Moreover, the terms "first", "second", and the like in the present disclosure are merely used for description and cannot be understood as indicating or implying their relative importance or as implicitly indicating the quantity of the technical features indicated. Thus, the feature defined by "first" or "second" may explicitly or implicitly include at least one such feature. In addition, the technical solutions of various embodiments may be combined with each other, but must be based on that the combined technical solutions can be implemented by those skilled in the art. When the combination of the technical solutions is contradictory or impossible to realize, it shall be considered that such combination does not exist and is not within the scope of protection of the present disclosure.

Figure 2:
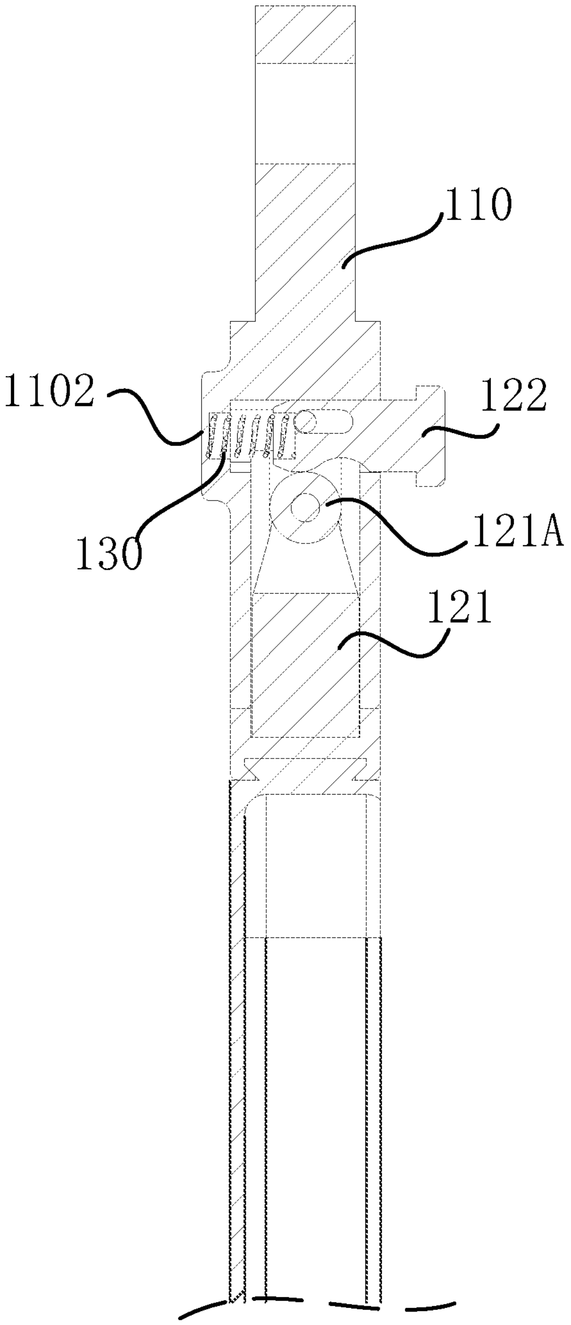
FIG. 2 is a partial sectional view of the connection between the connecting member and the structural member from one perspective according to an embodiment of the present disclosure.
Figure 3:
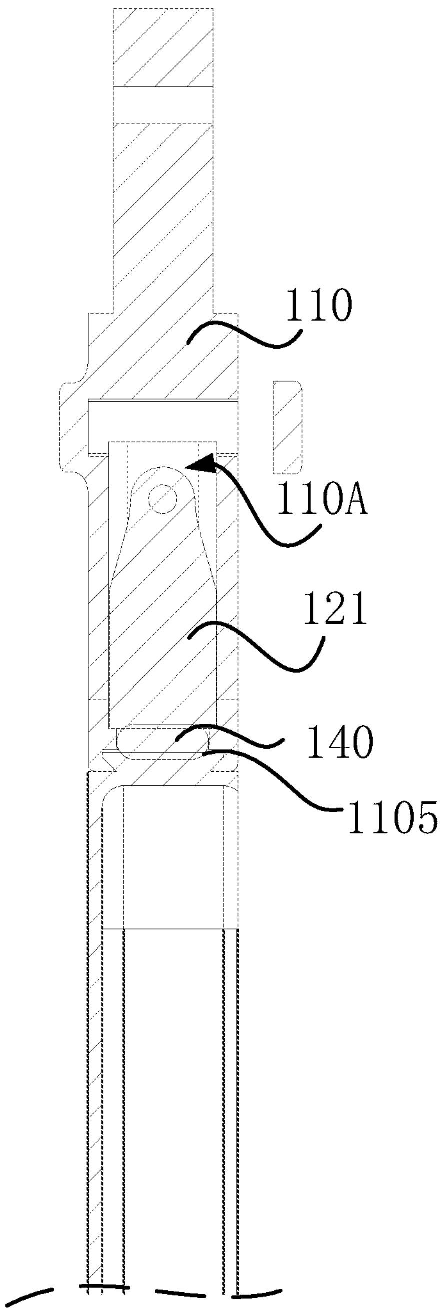
FIG. 3 is a partial sectional view of the connection between the connecting member and the structural member from another perspective according to an embodiment of the present disclosure.

Referring to FIG. 1 to FIG. 3, the present disclosure provides a connecting member 100, and the connecting member 100 includes a connecting base 110.

The connecting base 110 is defined with a nesting slot 111, and the connecting base 110 is fitted to a structural member 200 through the nesting slot 111. The structural member 200 is defined with an adapting slot 201, the connecting base 110 is provided with an driving structure 120, a reset member 130, and a clamping member 140, the clamping member 140 is exposed on a sidewall 1111 of the nesting slot 111 and matched to the adapting slot 201, the driving structure 120 is movably disposed on the connecting base 110, and the driving structure 120 is configured to drive the clamping member 140 to move. The structure of the driving structure 120 may be various, for example, a single structure or a combined structure, which may be selected according to an actual situation. For example, the driving structure 120 includes an pressing member 121 and an driving button 122, the clamping member 140 may dispose in a sliding path of the pressing member 121, the pressing member 121 is configured to press or loosen the clamping member 140, the driving button 122 may press and drive the pressing member 121 to slide, and the reset member 130 is configured to apply a force to the driving button 122 to reset the driving button 122.

The connecting member 100 has a locked state and an unlocked state, in the unlocked state, the pressing member 121 loosens the clamping member 140 when the driving button 122 loosens the pressing member 121, to loosen the clamping member 140 from the adapting slot 201; in the locked state, the pressing member 121 presses the clamping member 140 when the driving button 122 resets the pressing member 121, to clamp the clamping member 140 in the adapting slot 201.

The connecting member 100 of the embodiments of the present disclosure is applied to photographic equipment to realize a tight connection between two devices of the photographic equipment. The connecting member 100 may connect with a structural member 200. Specifically, in practical application, two devices (hereinafter first device and second device) of the photographic equipment may connect by way of a connection of the connecting member 100 with the structural member 200, for example, the first device may connect to the connecting member 100 by way of a screw connection, a snap connection, and the like. As shown in FIG. 1, the connecting base 110 of the connecting member 100 is defined with a connecting hole 112 through which a fastener is passed to connect the first device. The structural member 200 may be the second device to be connected, that is, the first device is connected to the connecting member 100, and the connecting member 100 is connected to the structural member 200 (the second device), allowing the two devices to be connected to each other. The structural member 200 may also be an intermediate member connected with the second device by way of screw connection or snap connection, that is, the first device may connect to the connecting member 100, the second device may connect to the structural member 200, the connecting member 100 may connect to the structural member 200, allowing the two devices to be connected to each other. There is no limits on a shape of the structural member 200, and the shape of the structural member 200 may set according to an actual situation. The first device may be a photographic handle 300, the second device may be an electronic product such as a cell phone, a camera, etc., and the structural member 200 may be a protective frame, such as a protective frame for a camera, a cell phone, etc., The adapting slot 201 may dispose on an outerside of the protective frame. The nesting slot 111 may set on an side of the connecting base 110, the nesting slot 111 may match to the structural member 200. When the connecting base 110 is sleeved on the structural member 200, the structural member 200 may pass through an end of the nesting slot 111 and out from another end of the nesting slot 111, the sidewall 1111 of the nesting slot 111 may be rotatable, such that the structural member 200 can be inserted vertically above the nesting slot 111. The clamping member 140 is configured to clamp in the adapting slot 201 of the structural member 200 in case the connecting base 110 is set on the structural member 200. In some embodiments, the reset member 130 may be a spring, and the spring may provide with one or more, as appropriate.

The connecting base 110 of the connecting member 100 is nested on the structural member 200 through the nesting slot 111. In case the clamping member 140 is clamped in the adapting slot 201, the connecting base 110 is fixed on the structural member 200. In case the clamping member 140 is out of the adapting slot 201, the connecting base 110 may slide along the structural member 200. In particular, in the unlocked state, the pressing member 121 loosens the clamping member 140 when the driving button 122 of the connecting base 110 loosens the pressing member 121, allowing the clamping member 140 to be loosened from the adapting slot 201, so as to allow the connecting member 100 and the structural member 200 being separable from each other. After being assembled, the connecting member 100 is in the locked state, and the pressing member 121 presses the clamping member 140 when the driving button 122 resets the pressing member 121, to clamp the clamping member 140 in the adapting slot 201. In this way, a tight connection between the connecting member 100 and the structural member 200 is realized, which in turn makes the connection between the two devices of the photographic equipment be tight, improving user experience.

In some embodiments, referring to FIG. 1 to FIG. 3, the connecting base 110 is defined with a mounting cavity 110A, and the pressing member 121 is slidably arranged in the mounting cavity 110A. The driving button 122 is slidably penetrated into the mounting cavity 110A and partially exposed from the connecting base 110. A slide direction of the driving button 122 and a slide direction of the pressing member 121 are different. An end of the reset member 130 may be resisted against the driving button 122, and the other end of the reset member 130 may be resisted against a sidewall 1102 of the mounting cavity 110A.

In this embodiment, the driving button 122 is arranged to be perpendicular to a sliding direction of the pressing member 121. In case the driving button 122 is pressed, the driving button 122 slides forward and releases the pressing member 121, the pressing member 121 releases the clamping member 140 during sliding, and the clamping member 140 is released from the adapting slot 201, thereby realizing unlocking and allowing the connecting member 100 to be detached from the structural member 200. In case the driving button 122 is loosened, under an action of the reset member 130, the driving button 122 slides backward to press the pressing member 121, making the pressing member 121 slide and press the clamping member 140, allowing the clamping member 140 to be clamped in the adapting slot 201, thereby realizing locking and making the connecting member 100 be fixed on the structural member 200.

In some embodiments, in order to facilitate sliding of the driving button 122 along the surface of the pressing member 121, an arcuate portion 121A is protruded on the pressing member 121, a pressing surface 1222 of the driving button 122 is defined with a groove 122A matched to the arcuate portion 121A, and the groove 122A is configured to accommodate the arcuate portion 121A to allow the pressing member 121 be loosened during a sliding process of the driving button 122.

In this embodiment, when the driving button 122 slides forward, a pressing surface of the driving button 122 may slide to the groove 122A along a surface 1211 of the arcuate portion 121A. The arcuate portion 121A may partially enter the groove 122A, causing the pressing member 121 to move away from a pressing surface 1211 of the arcuate portion 121A to loosen the clamping member 140 from the adapting slot 201, realizing unlocking. In case the driving button 122 is loosened, under an action of the reset member 130, the driving button 122 may slide backward, and the arcuate portion 121A may slide out of the groove 122A. When the pressing surface 1222 of the driving button 122 slides along the surface 1211 of the arcuate portion 121A, the pressing surface 1222 of the driving button 122 may press the arcuate portion 121A, causing the pressing member 121 sliding. The clamping member 140 is pressed by the pressing member 121 during the sliding process of the pressing member 121, allowing the clamping member 140 to be clamped in the adapting slot 201 and locked, thus realizing a connection between the connecting member 100 and the structural member 200.

In some embodiments, to ensure that the driving button 122 slides along the surface of the pressing member 121 smoothly, the arcuate portion 121A is rotatably arranged on the pressing member 121 by a shaft 1213. The arcuate portion 121A is cylindrical, and the arcuate portion 121A rotates when the driving button 122 slides along a surface 1211 of the arcuate portion 121A.

Figure 4:
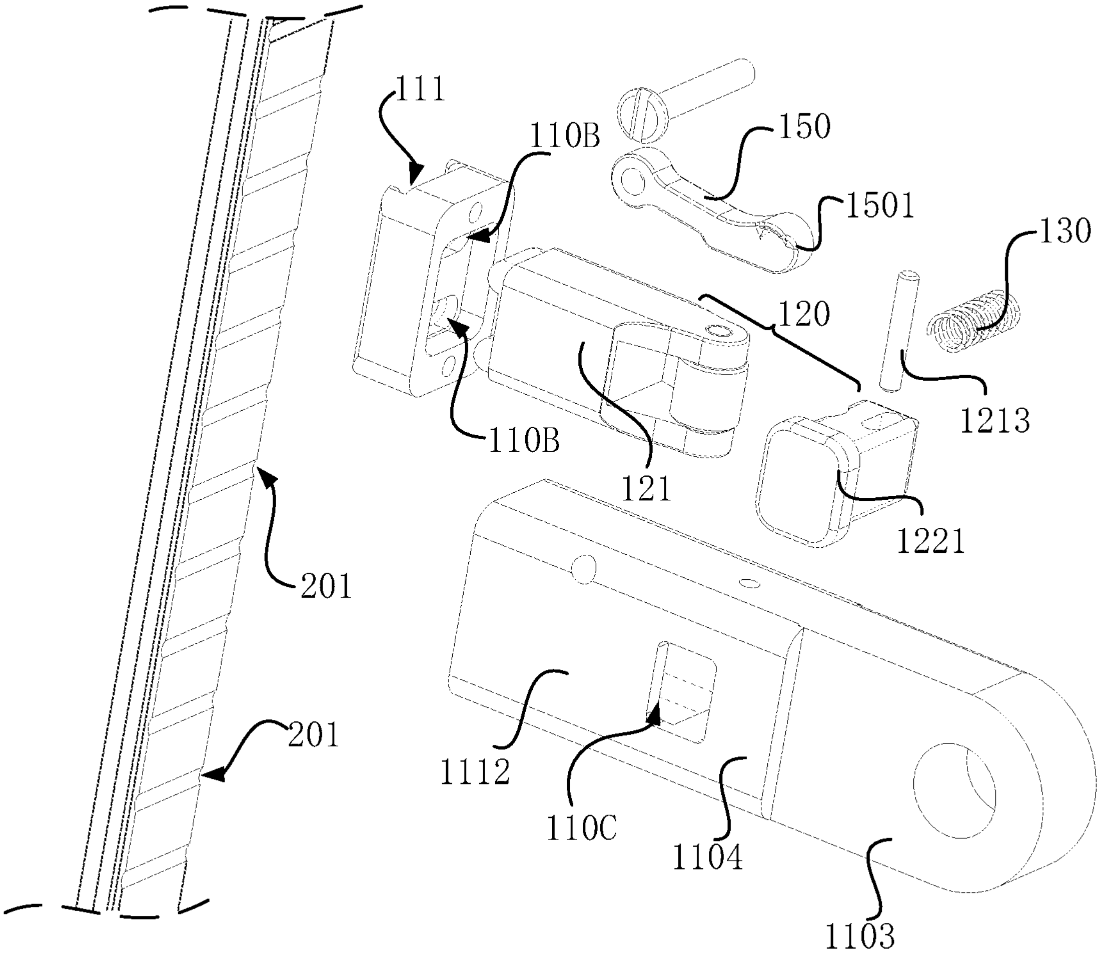
FIG. 4 is an exploded view of the connecting member and the structural member according to an embodiment of the present disclosure.

In some embodiments, referring to FIG. 4, the connecting base 110 includes a front base 1103 and a rear base 1104, and the front base 1103 and the rear base 1104 are connected by screws, which is easy to disassemble. A mounting cavity 110A is defined between the front base 1103 and the rear base 1104, the rear base 1104 is also defined with an opening 110C communicated with the mounting cavity 110A, and the driving button 122 is exposed from the opening 110C. The driving button 122 is located on a side of the rear base 1104, which is convenient for users to press. A sliding direction of the pressing member 121 is the same as an extension direction of the rear base 1104. The pressing member 121 may have a rectangular shape with a length being set based on a required distance between the structural member 200 and the first device. The pressing member 121 and a side wall of the mounting cavity 110A are gap-fit, to keep or limit the sliding direction of the pressing member 121. There can also be a concave-convex structure between the pressing member 121 and a side wall of the mounting cavity 110A, for example, the mounting cavity 110A is defined with a sliding groove matched to the pressing member 121, and the pressing member 121 is assembled in the sliding groove and slides along the sliding groove. The main structure of the pressing member 121, the reset member 130, and the actuator button 122 are accommodated in the mounting cavity 110A, and only a partial of the driving button 122 is exposed from the connecting base 110 for users to press, which realizes a concealing installation of the components and improves compactness of the structure and aesthetics of the appearance.

In some embodiments, referring to FIG. 3 and FIG. 4, a pressing surface of the pressing member 121 is defined with a pressing groove 1212 matched to the clamping member 140. In the locked state, an end of the clamping member 140 is limited in the pressing groove 1212, and the other end of the clamping member 140 is clamped in the adapting slot 201, to ensure a moving cavity for the clamping member 140 at a released state or a movable state. In the locked state of the clamping member 140, a contact surface between the clamping member 140 and the pressing surface of the pressing member 121 may be increased, improving a stability of the clamping member 140 and preventing the clamping member 140 from falling into the mounting cavity 110A after releasing from the adapting slot 201. A number of the pressing groove 1212 and a number of the clamping member 140 are the same. For each clamping member 140, a pressing groove 1212 is correspondingly arranged in the pressing surface of the pressing member 121 to limit the clamping member 140, and a position of the pressing groove 1212 in the pressing surface is set based on a position of the clamping member 140. At least one pressing member 121 is provided, at least two clamping members 140 are provided, and at least two adapting slots 201 are provided, that is, each clamping member 140 is held in one of the adapting slots 201. The clamping member 140 may be set in the shape of a waist. The pressing groove 1212 and the adapting slot 201 may respectively match to the clamping member 140.

In this embodiment, the connecting member 100 and the structural member 200 are connected by way of a snapping fit between the clamping member 140 and the adapting slot 201, which improves the tightness of connection between the connecting member 100 and the structural member 200, so as to further improve the tightness of connection between two devices of the photographic equipment. In addition, there are several adapting slots 201 in the structural member 200, and the adapting slots 201 may be sequentially arranged along a nesting direction of the connecting member 100, such that the mounting position of the connecting member 100 on the structural member 200 can be flexibly adjusted. In actual application, the mounting position of the connecting member 100 may be adjusted to avoid other relevant structures.

In some embodiments, referring to FIG. 4, a bottom wall 1105 of the mounting cavity 110A is defined with an accommodating slot 110B to receive the clamping member 140, the connecting base 110 is defined with a through-hole 113 communicating the nesting slot 111 with the accommodating slot 110B, and the clamping member 140 passes through the through-hole 113 and exposes from a sidewall 1111 of the nesting slot 111.

In this embodiment, a shape of the accommodating slot 110B is matched to a shape of the clamping member 140. The clamping member 140 is located in the accommodating slot 110B and passes through the through-hole 113 to expose from the sidewall 1111 of the nesting slot 111. When the pressing member 121 presses the clamping member 140, the clamping member 140 may be deformed to a taut state, to be stably clamped in the adapting slot 201. When the pressing member 121 does not press the clamping member 140, the clamping member 140 may return to an initial shape to a slack state, so that it can be released from the adapting slot 201. In some embodiments, the clamping member 140 has a deformable structure, and the clamping member 140 may be made of silicone material or other materials that are deformable, which is not limited herein and twill be chosen according to an actual need. In some embodiments, materials of the clamping member 140 may be metal, such as copper, aluminum alloy, or other alloys, which is not limited herein. In case there is a plurality of clamping members 140, a plurality of accommodating slots 110B are correspondingly provided in the mounting cavity 110A, each of the accommodating slots 110B accommodates one clamping member 140.

Figure 5:
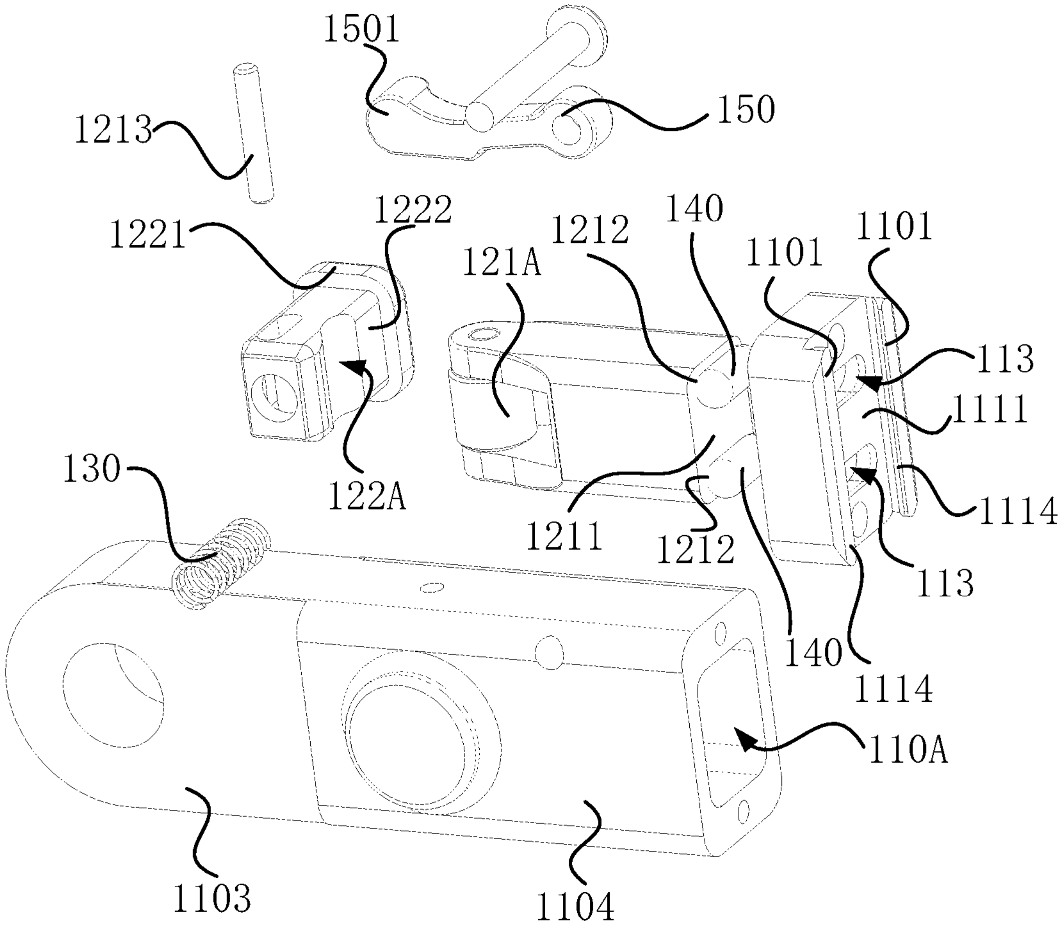
FIG. 5 is an exploded view of the connecting member according to an embodiment of the present disclosure.

In some embodiments, referring to FIG. 4 and FIG. 5, an end surface of the front base 1103 of the connecting base 110 is provided with two oppositely arranged nesting portions 1101, free ends of the two nesting portions 1101 may bend to face each other, and the nesting slot 111 is defined among the two nesting portions and the connecting base 110. The two nesting portions 1101 may be integrally molded with the connecting base 110, and the two nesting portions 1101 may extend from the end surface of the connecting base 110. The nesting slot 111 is defined among the two nesting portions 1101 and the connecting base 110. In case the connecting base 110 is nested on the structural member 200, the two nesting portions 1101 fit with opposite sides of the structural member 200.

The driving button 122 is located on a side of the rear base 1104 of the connecting base 110, a pressing direction of the driving button 122 is different from an extension direction of the nesting slot 111. In some embodiments, the pressing direction of the driving button 122 is perpendicular to the extension direction of the nesting slot 111. If there are other device mounted on the structural member 200, users may press the driving button 122 from a side of the connecting base 110 not facing the other device, which avoids interfering the pressing and unlocking operation, and is easy to use.

In some embodiments, referring to FIG. 1 and FIG. 5, the driving button 122 includes a pressing portion 1221 disposed on an outer side of the connecting base 110. To avoid unlocking caused by mis-touching or mis-pressing on the pressing portion 1221 of the driving button 122, the connecting member 100 is further provided with an anti-false-touch member 150 rotatably connected to the connecting base 110. A free end of the anti-false-touch member 150 is capable of rotating to between the pressing portion 1221 and the connecting base 110. The free end of the anti-false-touch member 150 may also be provided with a limiting portion (not shown), to prevent the free end of the anti-false-touch member 150 from sliding excessively into an area between the pressing portion 1221 and the connecting base 110, and provide a sense of locking to users, improving user experience.

In this embodiment, the free end of the anti-false-touch member 150 may rotate to between the pressing portion 1221 and the connecting base 110, which can avoid mis-touching or mis-pressing on the pressing portion 1221 of the driving button 122. The free end of the anti-false-touch member 150 may match the space between the pressing portion 1221 and the connecting base 110.

In some embodiments, the photographic handle 300 is provided with an external interface, such as a cold boot groove 301 or a threaded hole. The photographic handle 300 also includes a silicone grip section, and a friction pattern is set on an outer surface of the silicone grip section.

In summary, after assembling, the connecting member 100 and the structural member 200 are in the locked state, the free end of the anti-false-touch member 150 is located between the pressing portion 1221 and the connecting base 110. After the free end of the anti-false-touch member 150 is out of the initial position between the pressing portion 1221 and the connecting base 110, in case the pressing portion 1221 is pressed, the driving button 122 may slide forward, and the pressing surface 1222 of the driving button 122 may slide along the surface 1211 of the arcuate portion 121A to make the arcuate portion 121A be rotated, then the groove 122A of the pressing surface 1222 of the driving button 122 may leave its initial position and arrive at the position of the arcuate portion 121A to avoid the arcuate portion 121A. That is, partial of the arcuate portion 121A enters the groove 122A from the pressing surface 1222 of the driving button 122, making the pressing member 121 move away from the pressing surface 1211 of the arcuate portion 121A to release the clamping member 140, to allow the clamping member 140 to be loosened from the adapting slot 201, realizing unlocking and separating of the connecting member 100 and the structural member 200.

In case the pressing portion 1221 is loosened, under an action of the reset member 130, the driving button 122 may slide backward, and the groove 122A may reset from the position of the arcuate portion 121A to its initial position. When the arcuate portion 121A exits from the groove 122A and returns to the pressing surface, the pressing surface 1222 of the driving button 122 may slide along the surface 1211 of the arcuate portion 121A to cause the arcuate portion 121A rotating, and the pressing surface 1222 of the driving button 122 may press the arcuate portion 121A and drive the pressing member 121 to slide. During the sliding process of the pressing member 121, the pressing member 121 presses the clamping member 140 to allow the clamping member 140 to be clamped in the adapting slot 201, realizing locking and securing the connecting member 100 to the structural member 200. Then, the free end of the anti-false-touch member 150 may be rotated to between the pressing portion 1221 and the connecting base 110.

The present disclosure further provides a mounting and dismounting assembly, the mounting and dismounting assembly includes the structural member 200 and the connecting member 100 as set forth in the previous embodiments, the connecting base 110 is provided with a connecting structure to connect with the first device, and the connecting structure may be a screw, a mounting hole, a connecting hole, a cold boot groove, a sliding strip, an alethic positioning hole, and other connecting structures, which are not limited herein. The specific structure of the connecting member 100 refers to the above embodiments, and since the mounting and dismounting assembly adopts all the technical solutions of the foregoing embodiments, so it at least has all the technical effects brought by the technical solutions of the foregoing embodiments, which is not detailed herein. The structural member 200 may be an intermediate member for the connecting device, for example, as shown in FIG. 1, the structural member 200 may be a cell phone protective housing, the cell phone protective housing is configured to mount a cell phone, the cell phone protective housing is recessed with a mounting groove, the cell phone is accommodated in the mounting groove, and the connecting base 110 is connected with the photographic handle 300 through the connecting hole.

The above are only some embodiments of the present disclosure, and neither the words nor the drawings can limit the protection scope of the present disclosure. Any equivalent structural transformation made by using the contents of the specification and the drawings of the present disclosure under the overall concept of the present disclosure, or directly/indirectly applied in other related technical fields are included in the protection scope of the present disclosure.

What is claimed is:

1. A connecting member, comprising:

a connecting base defined with a nesting slot, the connecting base being configured to be fitted to a structural member through the nesting slot; the structural member being defined with an adapting slot, the connecting base being provided with a driving structure, a reset member, and a clamping member, the clamping member being exposed on a sidewall of the nesting slot and configured to be matched to the adapting slot, the driving structure being movably disposed on the connecting base, the driving structure comprising a pressing member and a driving button, the clamping member being disposed on a sliding path of the pressing member, the pressing member being configured to press or loosen the clamping member, the driving button pressing and driving the pressing member to slide, the reset member being configured to apply a force to the driving button to reset the driving button;

wherein the connecting member has a locked state and an unlocked state, in the unlocked state, the pressing member loosens the clamping member when the driving button loosens the pressing member, to loosen the clamping member from the adapting slot; and in the locked state, the pressing member presses the clamping member when the driving button resets the pressing member, to clamp the clamping member in the adapting slot;

wherein the connecting base is defined with a mounting cavity, the pressing member is slidably arranged in the mounting cavity, the driving button is slidably penetrated into the mounting cavity and is at least partially exposed outside the connecting base, slide directions of the driving button and the pressing member are different, an end of the reset member resists the driving button, and the other end of the reset member resists a sidewall of the mounting cavity; and wherein an arcuate portion is protruded on the pressing member, a pressing surface of the driving button is defined with a groove matched to the arcuate portion, and the groove is configured to accommodate the arcuate portion during sliding of the driving button to loosen the pressing member.

2. The connecting member according to claim 1, wherein the arcuate portion is rotatably arranged on the pressing member by a shaft, the arcuate portion is cylindrical, and the arcuate portion rotates when the driving button slides along a surface of the arcuate portion.

3. The connecting member according to claim 1, wherein the connecting base comprises a front base and a rear base fixedly connected to the front base, the mounting cavity is defined between the front base and the rear base, a sliding direction of the pressing member is same as an extension direction of the rear base, and the driving button is located on a side of the rear base.

4. The connecting member according to claim 1, wherein a pressing surface of the pressing member is defined with a pressing groove matched to the clamping member; in the locked state, an end of the clamping member is limited in the pressing groove.

5. The connecting member according to claim 1, wherein at least two clamping members are provided, at least two adapting slots are provided, and each clamping member is clamped in one of the adapting slots; and/or a bottom wall of the mounting cavity is defined with an accommodating slot to accommodate the clamping member, the connecting base is defined with a through-hole communicating the nesting slot and the accommodating slot, and the clamping member passes through the through-hole and exposed from a sidewall of the nesting slot.

6. The connecting member according to claim 1, wherein the driving button comprises a pressing portion disposed on an outer side of the connecting base, the connecting member further comprises an anti-false-touch member rotatably connected to the connecting base, and a free end of the anti-false-touch member is capable of rotating to between the pressing portion and the connecting base.

7. The connecting member according to claim 1, wherein an end face of the connecting base is provided with two oppositely arranged nesting portions, free ends of the two nesting portions are bent to face each other and the nesting slot is formed among the two nesting portions and the connecting base; and/or a pressing direction of the driving button is different from an extension direction of the nesting slot.

8. A mounting and dismounting assembly, wherein the mounting and dismounting assembly comprises a structural member and a connecting member;

wherein the connecting member comprises:

a connecting base defined with a nesting slot, the connecting base being configured to be fitted to a structural member through the nesting slot; the structural member being defined with an adapting slot, the connecting base being provided with a driving structure, a reset member, and a clamping member, the clamping member being exposed on a sidewall of the nesting slot and configured to be matched to the adapting slot, the driving structure being movably disposed on the connecting base, the driving structure comprising a pressing member and a driving button, the clamping member being disposed on a sliding path of the pressing member, the pressing member being configured to press or loosen the clamping member, the driving button pressing and driving the pressing member to slide, and the reset member being configured to apply a force to the driving button to reset the driving button;

wherein the connecting member has a locked state and an unlocked state, in the unlocked state, the pressing member loosens the clamping member when the driving button loosens the pressing member, to loosen the clamping member from the adapting slot; and in the locked state, the pressing member presses the clamping member when the driving button resets the pressing member, to clamp the clamping member in the adapting slot;

wherein the connecting base is defined with a mounting cavity, the pressing member is slidably arranged in the mounting cavity, the driving button is slidably penetrated into the mounting cavity and is at least partially exposed outside the connecting base, slide directions of the driving button and the pressing member are different, an end of the reset member resists the driving button, and the other end of the reset member resists a sidewall of the mounting cavity; the connecting base is provided with a connecting structure to connect with a first device; and wherein an arcuate portion is protruded on the pressing member, a pressing surface of the driving button is defined with a groove matched to the arcuate portion, and the groove is configured to accommodate the arcuate portion during sliding of the driving button to loosen the pressing member.

* * * * *